US008592573B2

(12) United States Patent
Barcus et al.

(10) Patent No.: US 8,592,573 B2
(45) Date of Patent: Nov. 26, 2013

(54) THERMOPLASTIC HETEROPOLYSACCHARIDE DERIVATIVES AND METHODS FOR MAKING SAME

(75) Inventors: Robert Lee Barcus, Springfield Township, OH (US); Alyssandrea Hope Hamad-Ebrahimpour, Cincinnati, OH (US); Alan Howard Ullman, Blue Ash, OH (US); Dean Van Phan, West Chester, OH (US); Mark Edwin Forry, Fairfield Township, OH (US); John Collins Dyer, Evendale, OH (US); Timothy Duane Smith, Lebanon, OH (US); Jeanette Marie Swartz, Loveland, OH (US); Yonas (NMN) Gizaw, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 953 days.

(21) Appl. No.: 12/540,686

(22) Filed: Aug. 13, 2009

(65) Prior Publication Data

US 2010/0044627 A1    Feb. 25, 2010

Related U.S. Application Data

(60) Provisional application No. 61/090,945, filed on Aug. 22, 2008.

(51) Int. Cl.
*C08B 37/14* (2006.01)
*C09K 3/00* (2006.01)
*C07H 15/04* (2006.01)

(52) U.S. Cl.
USPC .............. 536/120; 536/123; 252/182.12

(58) Field of Classification Search
USPC .................... 536/120; 252/182.12
See application file for complete search history.

(56) References Cited

U.S. PATENT DOCUMENTS

| 5,430,142 A | 7/1995 | Glasser et al. |
| 2003/0094719 A1 | 5/2003 | Yang et al. |
| 2008/0234476 A1* | 9/2008 | Phan et al. .............. 536/56 |

FOREIGN PATENT DOCUMENTS

WO    WO 2008/078248 A1    7/2008

OTHER PUBLICATIONS

Carson, et al., "Esters of Lima Bean Pod and Corn Cob Hemicelluloses", *Journal of the American Chemical Society*, vol. 70, pp. 293-295 (Jan. 1, 1948).
Le Digabel, et al., "Effects of lignin content on the properties of lignocellulose-based biocomposites", *Carbohydrate Polymers, Applied Science Publishers, Ltd.*, vol. 66, No. 4, pp. 534-545 (Nov. 23, 2006).
PCT International Search Report Mailed Nov. 26, 2009.

* cited by examiner

*Primary Examiner* — Peter F Godenschwager
(74) *Attorney, Agent, or Firm* — Wednesday G. Shipp; G. Brant Cook

(57) ABSTRACT

Thermoplastic heteropolysaccharide derivatives, articles employing such thermoplastic heteropolysaccharide derivatives and methods for making such thermoplastic heteropolysaccharide derivatives are provided.

24 Claims, No Drawings

THERMOPLASTIC HETEROPOLYSACCHARIDE DERIVATIVES AND METHODS FOR MAKING SAME

CROSS REFERENCE TO RELATED APPLICATION

This application claims the benefit of U.S. Provisional Application No. 61/090,945 filed Aug. 22, 2008.

FIELD OF THE INVENTION

The present invention relates to thermoplastic heteropolysaccharide derivatives, articles comprising such thermoplastic heteropolysaccharide derivatives and methods for making such thermoplastic heteropolysaccharide derivatives.

BACKGROUND OF THE INVENTION

With the ever increasing price of existing raw materials, such as petroleum-based materials, used in making polymeric articles, such as nonwovens, films including packaging films, foams and molded articles, the search for alternative raw materials continues. In the past, formulators have identified various types of possible alternatives for use in making polymeric articles, especially nonwovens, such as cellulose acetate and polyhydroxyalkanoate materials. Formulators have also attempted to reduce the level of petroleum-based materials by replacing some of the petroleum-based materials with thermoplastic hemicellulose and/or hemicellulose derivatives to form a blend, for example, a blend of polyethylene and a hemicellulose derivative. However, such alternative raw materials and/or blends have always presented some negatives either in the cost and/or complexity of processing such raw materials or in the existence of certain properties, such as water-solubility, that are not desired within certain polymeric articles, especially certain nonwovens, such as sanitary tissue products.

Accordingly, there is a need for novel raw materials suitable for use in making polymeric articles, especially nonwovens, which overcome the negatives associated with existing raw materials.

SUMMARY OF THE INVENTION

The present invention fulfills the needs described above by providing novel raw materials comprising a thermoplastic heteropolysaccharide derivative.

In order for raw materials to be suitable for use in certain polymeric articles, especially nonwovens, more particularly disposable absorbent nonwoven substrates such as paper towels, facial tissue and/or toilet tissue, the raw materials need to exhibit wetting properties that make the disposable absorbent nonwoven substrates operable and thus not too hydrophobic. It has been found that thermoplastic heteropolysaccharide derivatives that exhibit contact angles of less than about 80° as determined by the Contact Angle Test Method described herein exhibit minimum wetting properties such that they are not too hydrophobic for use in disposable absorbent nonwoven substrates.

In addition to not being too hydrophobic, raw materials that are suitable for use in certain polymeric articles, especially nonwovens, more particularly disposable absorbent nonwoven substrates such as paper towels, facial tissue and/or toilet tissue need to exhibit water solubility properties such that the substrates do not dissolve too readily upon contacting liquids during use by a consumer. It has been found that thermoplastic heteropolysaccharide derivatives that exhibit water solubilities of less than about 10% as determined by the Water Solubility Test Method described herein are not too water soluble for use in disposable absorbent nonwoven substrates.

In one example of the present invention, a thermoplastic heteropolysaccharide derivative that exhibits a contact angle of less than about 80° as measured by the Contact Angle Test Method described herein is provided.

In another example of the present invention, a thermoplastic heteropolysaccharide derivative that exhibits a contact angle of less than about 80° as measured by the Contact Angle Test Method described herein and a water solubility of less than about 10% as measured by the Water Solubility Test Method described herein is provided.

In yet another example of the present invention, an article comprising a thermoplastic heteropolysaccharide derivative according to the present invention is provided.

In still another example of the present invention, a method for making a thermoplastic heteropolysaccharide derivative, the method comprises the step of reacting a heteropolysaccharide, such as a hemicellulose, with a 1,2-epoxy compound having the formula:

wherein $R^1$ is independently selected from the group consisting of: linear or branched aliphatic groups, $-CH_2OR^2$ wherein $R^2$ is independently selected from the group consisting of: linear or branched aliphatic groups and mixtures thereof such that a thermoplastic heteropolysaccharide derivative that exhibits a contact angle of less than about 80° as determined by the Contact Angle Test Method and a water solubility of less than about 10% as determined by the Water Solubility Test Method is produced, is provided.

In even another example of the present invention, a method for making a heteropolysaccharide derivative, the method comprises the step of reacting a heteropolysaccharide, such as a hemicellulose, with a first 1,2-epoxy compound having the formula:

wherein $R^3$ is independently selected from the group consisting of: H, $C_1$ to $C_4$ aliphatic groups, $-CH_2OR^4$ wherein $R^4$ is independently selected from the group consisting of: $C_1$ to $C_4$ aliphatic groups and mixtures thereof and a second 1,2-epoxy compound having the formula:

wherein $R^5$ is independently selected from the group consisting of: $C_6$ or greater linear or branched aliphatic groups, $-CH_2OR^6$ wherein $R^6$ is independently selected from the group consisting of: $C_6$ or greater linear or branched aliphatic groups and mixtures thereof such that a thermoplastic heteropolysaccharide derivative is produced is provided.

Non-limiting examples of 1,2-epoxy compounds for use as the first 1,2-epoxy compound include ethylene oxide, propylene oxide, 1,2-epoxybutane, n-butylglycidyl ether and mixtures thereof.

Non-limiting examples of 1,2-epoxy compounds for use as the second 1,2-epoxy compound include 1,2-epoxyhexane, n-hexylglycidyl ether, 2-ethylhexyl glycidyl ether, n-octylglycidyl ether, n-decylglycidyl ether and mixtures thereof.

In even still yet another example of the present invention, an article comprising a thermoplastic heteropolysaccharide derivative, wherein the article exhibits a contact angle of less than about 80° as determined by the Contact Angle Test Method and a water solubility of less than about 10% as determined by the Water Solubility Test Method, is provided.

In still another example of the present invention, a heteropolysaccharide derivative and/or a thermoplastic heteropolysaccharide derivative exhibiting a carbon atom to oxygen atom ratio of greater than about 1.85 and/or greater than about 1.90 and/or greater than about 1.95 and/or greater than about 2.0 as determined by the Elemental Analysis Test Method described herein is provided.

Accordingly, the present invention provides thermoplastic heteropolysaccharide derivatives that exhibit properties suitable for use in making polymeric articles, especially nonwovens that can be used in sanitary tissue products and/or other consumer products, articles comprising such thermoplastic heteropolysaccharide derivatives and methods for making such thermoplastic heteropolysaccharide derivatives.

DETAILED DESCRIPTION OF THE INVENTION

Definitions

"Polysaccharide" as used herein means a polymer comprising a plurality of monosaccharides (sugar units), typically pentose and/or hexose sugar units. Non-limiting examples of suitable polysaccharides include, but are not limited to, starches, celluloses, hemicelluloses, xylans, gums, arabinans, galactans and mixtures thereof. The term "polysaccharide" is also meant to include polymers with heteroatoms present in the polysaccharide structure, such as chitin and/or chitosan.

"Polysaccharide derivative" as used herein means that one or more of the original hydroxyl moieties (—OH) present on one or more monomer units (sugar units) of a pure polysaccharide has been chemically modified and/or replaced with a moiety other than merely —OH (a non-hydroxyl moiety), such as a hydroxyalkyl moiety. In one example, the polysaccharide derivative exhibits a weight average molecular weight of less than 1,000,000 g/mol and/or less than 800,000 g/mol and/or less than 600,000 g/mol and/or less than 400,000 g/mol to about 500 g/mol and/or to about 1,000 g/mol and/or to about 5,000 g/mol.

"Heteropolysaccharide" as used herein means a polysaccharide that comprises different types of sugar units. For example, a heteropolysaccharide may comprise pentose sugar units and hexose sugar units. Further, a heteropolysaccharide may comprise different types of pentose sugar units and/or hexose sugar units. Whether a material is a heteropolysaccharide or not, for purposes of this invention, is determined according to the Heteropolysaccharide Determination Test Method described herein.

"Heteropolysaccharide derivative" as used herein means one or more of the original hydroxyl moieties present on one or more monomer units (sugar units, typically pentose and hexose sugar units) of a pure heteropolysaccharide has been substituted with an hydroxyalkyl moiety. The heteropolysaccharide derivative may be a hemicellulose derivative. The heteropolysaccharide derivative may comprise a heteropolysaccharide backbone comprising one or more pentoses and/or one or more hexoses.

"Hemicellulose" as used herein means a heteropolysaccharide. Non-limiting examples of sugar and/or sugar acid units found in hemicellulose include one or more of the following: pentoses, such as xylose, arabinopyranose and arabinofuranose; hexoses, such as glucose, mannose and galactose; hexuronic acids, such as glucuronic acid, methylglucuronic acid and galacturonic acid; and deoxy-hexoses, such as rhamnose and fucase. In one example, the hemicellulose of the present invention comprises a polysaccharide comprising a monomer selected from the group consisting of: D-glucose, D-glucuronic acid, D-mannose, D-arabinose, D-xylose, D-xylopyranose, D-glucopyranose, D-galactopyranose, L-arabinofuranose, D-mannopyranose, D-glucopyranosyluronic acid, β-D-xylose, β-D-glucose, β-D-glucuronic acid, β-D-mannose, α-L-rhamnose, α-L-arabinopyranose, α-L-fucase, α-L-arabinofuranose, α-D-4-O-methylglucuronic acid, α-D-galactose, α-D-galacturonic acid and mixtures thereof.

In one example, the hemicellulose of the present invention includes a polysaccharide selected from the group consisting of: xylan, glucuronoxylan, arabinoxylan, glucomannan, galactoglucomannan, xyloglucan and mixtures thereof.

A hemicellulose of the present invention may exhibit a weight average molecular weight of less than about 500,000 g/mol and/or less than about 400,000 g/mol and/or less than about 300,000 g/mol and/or less than about 200,000 g/mol and/or less than about 150,000 g/mol and/or less than about 100,000 g/mol and/or less than about 70,000 g/mol and/or less than about 50,000 g/mol and/or less than about 30,000 g/mol and/or less than about 20,000 g/mol and/or from less than about 15,000 g/mol and/or to about 500 g/mol and/or to about 1,000 g/mol and/or to about 5,000 g/mol and/or to about 7,000 g/mol. In one example, the hemicellulose of the present invention exhibits a weight average molecular weight of from about 500,000 to about 7,000 g/mol.

A hemicellulose of the present invention may be obtained by chemical and/or enzymatic processes known by those of ordinary skill in the art from a wood source, such as wood pulp, and/or from a non-wood source. Hemicellulose may be obtained from wood pulp from hardwood trees, such as tropical hardwood trees, for example eucalyptus and/or acacia trees. Hemicellulose may be obtained from wood pulp from softwood trees, such as northern softwood trees and/or southern softwood trees. Non-limiting examples of non-wood sources of hemicellulose include corn hulls and/or corn bran.

"Hemicellulose derivative" as used herein means one or more of the original hydroxyl groups present on one or more monomer units (sugar units) of a pure hemicellulose has been substituted with one or more hydroxyalkyl moieties.

"Molar substitution" or "MS" as used herein means the average number of moles of hydroxyalkyl moiety per mole of monomer (sugar) unit.

"Article" as used herein means a physical article comprising a polymer. Non-limiting examples of articles include films including packaging films, foams, fibers, filaments, particles, molded objects and mixtures thereof.

"Thermoplastic" as used herein means, with respect to a material, such as a heteropolysaccharide derivative, that the material satisfies the Film-Forming Method described herein.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121. Unless otherwise specified, all molecular weight values herein refer to the weight average molecular weight.

Thermoplastic Heteropolysaccharide Derivative

In one example, the heteropolysaccharide derivative of the present invention is a thermoplastic heteropolysaccharide derivative.

The heteropolysaccharide derivative may exhibit a contact angle as measured by the Contact Angle Test Method described herein of less than about 80° and/or less than about 75° and/or less than about 70° and/or less than about 60° and/or less than about 50° and/or greater than about 25° and/or greater than about 30° and/or greater than about 35° and/or greater than about 40°.

The heteropolysaccharide derivative may exhibit a water solubility of less than about 10% and/or less than about 7.5% and/or less than about 5% and/or less than about 3% and/or to about 0% and/or to about 1% as measured by the Water Solubility Test Method described herein.

In another example, the thermoplastic heteropolysaccharide derivative comprises an anhydroxylose unit. In still another example, the thermoplastic heteropolysaccharide derivative comprises a thermoplastic hemicellulose derivative.

One or more of the hydroxyl moieties present on unsubstituted heteropolysaccharide may be replaced with one or more hydroxyalkyl ether moieties to create a thermoplastic heteropolysaccharide derivative comprising one or more hydroxyalkyl ether moieties.

In one example, the thermoplastic heteropolysaccharide derivative may comprise one or more monosaccharide units having the formula:

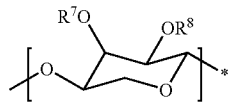

wherein $R^7$ is independently selected from —H, —[CH$_2$CH(R$^9$)O]$_m$H, —[CH$_2$CH(CH$_2$OR$^{10}$)O]$_n$H and mixtures thereof, wherein $R^9$ is independently selected from the group consisting of: linear or branched aliphatic group and mixtures thereof, wherein $R^{10}$ is independently selected from the group consisting of: linear or branched aliphatic group and mixtures thereof, wherein each of m and n are at least 1; wherein $R^8$ is independently selected from —H, —[CH$_2$CH(R$^{11}$)O]$_p$H, —[CH$_2$CH(CH$_2$OR$^{12}$)O]$_q$H and mixtures thereof, wherein $R^{11}$ is independently selected from the group consisting of: linear or branched aliphatic group and mixtures thereof, wherein $R^{12}$ is independently selected from the group consisting of: linear or branched aliphatic group and mixtures thereof, wherein each of p and q are at least 1; wherein the monosaccharide unit comprises at least one $R^7$ and/or $R^8$ that is not —H. $R^9$ may be independently selected from the group consisting of: $C_1$-$C_{10}$ and/or $C_2$-$C_4$ linear or branched aliphatic groups and mixtures thereof. $R^{10}$ may be independently selected from the group consisting of: $C_1$-$C_{14}$ and/or $C_3$-$C_{12}$ and/or $C_6$-$C_{10}$ linear or branched aliphatic groups and mixtures thereof. $R^{11}$ may be independently selected from the group consisting of: $C_1$-$C_{14}$ and/or $C_1$-$C_{10}$ and/or $C_2$-$C_4$ linear or branched aliphatic groups and mixtures thereof. $R^{12}$ may be independently selected from the group consisting of: $C_1$-$C_{14}$ and/or $C_3$-$C_{12}$ and/or $C_6$-$C_{10}$ linear or branched aliphatic groups and mixtures thereof. In one example, $R^7$ and $R^8$ may be the same.

In one example, the thermoplastic heteropolysaccharide derivative may exhibit a weight average molecular weight of greater than about 10,000 g/mol and/or greater than about 20,000 g/mol and/or greater than about 30,000 g/mol and/or greater than about 50,000 g/mol and/or to about 500,000 g/mol and/or to about 400,000 g/mol and/or to about 300,000 g/mol and/or to about 250,000 g/mol and/or to about 200,000 g/mol and/or to about 180,000 g/mol and/or to about 160,000 g/mol. In one example, the thermoplastic heteropolysaccharide derivative exhibits a weight average molecular weight of from about 10,000 to about 500,000 g/mol.

The thermoplastic heteropolysaccharide derivative may exhibit a Tg of less than about 200° C. and/or less than about 160° C. and/or less than about 150° C. and/or less than about 140° C. and/or less than about 125° C. and/or less than about 100° C. as measured according to the DSC Test Method described herein. In one example, the thermoplastic heteropolysaccharide derivative exhibits a Tg that varies with moisture level.

The thermoplastic heteropolysaccharide derivative may be in a composition that comprises other polysaccharides and/or polysaccharide derivatives such as cellulose and/or starch and/or derivatives thereof. In one example, such a composition may exhibit a single Tg.

Source of Thermoplastic Heteropolysaccharide Derivative

The thermoplastic heteropolysaccharide derivative of the present invention may be derived from a non-wood source. The non-wood source may comprise an agricultural byproduct. Non-limiting examples of suitable agricultural byproducts may be selected from the group consisting of: corn hulls, corn bran, corn fiber, corn stalks, corn cobs, sugar beet pulp, soybean hulls, wheat bran, wheat straw, distiller's grain, oat spelts, and mixtures thereof. Other non-wood sources include algae, such as green algae, grasses, bast fibers and mixtures thereof.

In addition and/or alternatively, the thermoplastic heteropolysaccharide derivative of the present invention may be derived from a wood source. Non-limiting examples of wood sources include wood pulp, such as softwood pulp such as NSK (Northern Softwood Kraft) pulp and/or SSK (Southern Softwood Kraft) pulp, and hardwood pulp, such as eucalyptus pulp and/or acacia pulp.

In addition to the thermoplastic heteropolysaccharide derivative, other polysaccharides and/or polysaccharide derivatives such as cellulose and/or starch and derivatives thereof may also be obtained from the source of the thermoplastic heteropolysaccharide derivative.

Article

The thermoplastic heteropolysaccharide derivative may be formed into an article, such as a film, foam, fiber, filament, particle and mixtures thereof, comprising a thermoplastic heteropolysaccharide derivative of the present invention. In one example, the article may comprise at least about 10% and/or at least about 20% and/or at least about 30% and/or to about 100% and/or to about 95% and/or to about 90% and/or to about 70% by weight of the thermoplastic heteropolysaccharide derivative.

In addition to the thermoplastic heteropolysaccharide derivative, the article may further comprise a non-heteropolysaccharide selected from the group consisting of: cellulose, starch and mixtures thereof. In one example, in addition to the thermoplastic heteropolysaccharide derivative, the article further comprises a thermoplastic polysaccharide selected from the group consisting of: thermoplastic starch, thermoplastic starch derivative, thermoplastic cellulose, thermoplastic cellulose derivative and mixtures thereof. The article may further comprise a hydrophilizing agent (wetting agent).

In one example, the article of the present invention may exhibit a contact angle of less than about 80° as determined by the Contact Angle Test Method and a water solubility of less than about 10% as determined by the Water Solubility Test Method.

Method for Making Thermoplastic Heteropolysaccharide Derivative

The thermoplastic heteropolysaccharide derivative of the present invention may be made by a method comprising the step of reacting a heteropolysaccharide, such as a hemicellulose, with a 1,2-epoxy compound having the formula:

wherein $R^1$ is independently selected from the group consisting of: $C_6$ or greater linear or branched aliphatic groups, —$CH_2OR^2$ wherein $R^2$ is independently selected from the group consisting of: $C_6$ or greater linear or branched aliphatic groups and mixtures thereof. In one example, the 1,2-epoxy compound is selected from the group consisting of: a 1,2-epoxyhexane, n-hexylglycidyl ether, 2-ethylhexyl glycidyl ether, n-octylglycidyl ether, n-decylglycidyl ether and mixtures thereof.

In one example, this reaction step occurs at a pH of from about 12.3 to about 13.

In another example of the present invention, the thermoplastic heteropolysaccharide derivative of the present invention may be made by a method comprising the step of reacting a heteropolysaccharide, such as a hemicellulose, with a first 1,2-epoxy compound having the formula:

wherein $R^3$ is independently selected from the group consisting of: H, $C_1$ to $C_4$ aliphatic groups, —$CH_2OR^4$ wherein $R^4$ is independently selected from the group consisting of: $C_1$ to $C_4$ aliphatic groups and mixtures thereof; and a second 1,2-epoxy compound having the formula:

wherein $R^5$ is independently selected from the group consisting of: $C_6$ or greater linear or branched aliphatic groups, —$CH_2OR^6$ wherein $R^6$ is independently selected from the group consisting of: $C_6$ or greater linear or branched aliphatic groups and mixtures thereof.

In one example, this first reaction step occurs at a pH of from about 11.5 to about 12.5 and the second reaction step occurs at a pH of from about 12.3 to about 13.

The first 1,2-epoxy compound may be selected from the group consisting of: ethylene oxide, propylene oxide, 1,2-epoxybutane, n-butylglycidyl ether and mixtures thereof.

The second 1,2-epoxy compound may be selected from the group consisting of: 1,2-epoxyhexane, n-hexylglycidyl ether, 2-ethylhexyl glycidyl ether, n-octylglycidyl ether, n-decylglycidyl ether and mixtures thereof.

In another example, a thermoplastic heteropolysaccharide derivative according to the present invention may be produced by first producing a water soluble derivative such as that provided by reacting a heteropolysaccharide with bromoacetic acid to produce a carboxymethyl derivative. The carboxymethyl derivative may then be further reacted with a 1,2-epoxy compound having the formula described above for the second 1,2 epoxy compound.

In one example, the method of the present invention further comprises the step of crosslinking the thermoplastic heteropolysaccharide derivative.

NON-LIMITING SYNTHESIS EXAMPLES

Example 1

Hemicellulose powder (60.0 g) obtained from Grain Processing Corporation of Iowa is added in portions to 400 mL of water in a 1 L beaker on a hot plate/stirrer. The mixture is stirred with heating (60-70° C.) until all of the hemicellulose is dissolved. Sodium sulfate (5. g) is added and the solution is cooled to room temperature (23.3° C.±4° C.) and then adjusted to pH 11.5 with 25% NaOH. The solution is then transferred to a glass flask, a 1 L Parr 51111 Low Pressure Reactor Vessel commercially available from Parr Instrument Company. 1,2-Epoxybutane (50 mL) is then added to the glass flask. The glass flask is then sealed onto a stainless steel head with a clamp. The head is fitted with a multi-blade impeller, cooling loop, pressure relief valves and a gas inlet port. The solution is stirred for 4 hours at 80° C. and 20 psi. After cooling to room temperature, the glass flask is removed from the reactor. A small aliquot of the solution is added to acetone to precipitate an analytical sample of the product; namely, a hydroxybutyl hemicellulose. The MS of the hydroxybutyl hemicellulose derivative is 0.39 as measured by $^1$H-NMR spectroscopy (300 MHz, DMSO-$d_6$).

The remaining solution in the glass flask is adjusted to pH 13.0 with 25% NaOH. 2-Ethylhexyl glycidyl ether (75 mL) is added to the glass flask and sealed to the Parr Reactor head again. The mixture is stirred for 4 hours at 125° C. and 45 psi. During this time, a solid precipitated from the reaction mixture. After cooling to room temperature, the solid is collected by suction filtration, washed with 1 L of distilled water and then dried in a vacuum oven to obtain 134.8 g of the solid product. This solid product is ground into a powder using a Wiley mill fitted with a 20 mesh screen and then washed with 500 mL of acetone. The resulting product (92.1 g) is a light brown solid. The MS of the 2-ethylhexyl glycerol ether moiety is 0.26 as measured by $^1$H-NMR spectroscopy (300 MHz, DMSO-$d_6$). The Tg as measured according to DSC Test Method described herein is 149.0° C.

A film pressed from this product according to the Film-Forming Method described herein exhibits a contact angle of 70° according to the Contact Angle Test Method and a water solubility of 2.1% according to the Water Solubility Test Method described herein.

Example 2

Hemicellulose powder (60.0 g) obtained from Grain Processing Corporation is added in portions to 400 mL of water in a 1 L beaker on a hot plate/stirrer. The mixture is stirred with heating (60-70° C.) until all of the hemicellulose is dissolved. Sodium sulfate (2.5 g) is added and the solution is cooled to room temperature (23.3° C.±4° C.) and then adjusted to pH 11.9 with 25% NaOH. The solution is then transferred to a glass flask, a 1 L Parr 51111 Low Pressure Reactor Vessel commercially available from Parr Instrument Company. 1,2-Epoxybutane (50 mL) is then added to the glass flask. The glass flask is then sealed onto a stainless steel head with a clamp. The head is fitted with a multi-blade impeller, cooling loop, pressure relief valves and a gas inlet port. The solution is stirred for 4 hours at 80° C. and 20 psi. After cooling to room temperature, the glass flask is removed from the reactor. A small aliquot of the solution is added to acetone to precipitate an analytical sample of the product; namely, a hydroxybutyl hemicellulose. The MS of the hydroxybutyl hemicellulose derivative is 0.46 as measured by $^1$H-NMR spectroscopy (300 MHz, DMSO-$d_6$).

The remaining solution in the glass flask is adjusted to pH 12.7 with 25% NaOH. 2-Ethylhexyl glycidyl ether (75 mL) is added to the glass flask and sealed to the Parr Reactor head again. The mixture is stirred for 4 hours at 125° C. and 45 psi. During this time, a solid precipitated from the reaction mixture. After cooling to room temperature, the solid is collected by suction filtration, washed with 1 L of distilled water and then dried in a vacuum oven of the solid product. This solid product is ground into a powder using a Wiley mill fitted with a 20 mesh screen and then washed with 500 mL of acetone. The resulting product (90.0 g) is a light brown solid. The MS of the 2-ethylhexyl glycerol ether moiety is 0.17 as measured by $^1$H-NMR spectroscopy (300 MHz, DMSO-$d_6$). The Tg as measured according to DSC Test Method described herein is 139.0° C.

A film pressed from this product according to the Film-Forming Method described herein exhibits a contact angle of 70° according to the Contact Angle Test Method and a water solubility of 6.8% according to the Water Solubility Test Method described herein.

Example 3

Comparative Example

Hemicellulose powder (60.0 g) obtained from Grain Processing Corporation is added in portions to 400 mL of water in a 1 L beaker on a hot plate/stirrer. The mixture is stirred with heating (60-70° C.) until all of the hemicellulose is dissolved. Sodium sulfate (5.0 g) is added and the solution is cooled to room temperature (23.3° C.±4° C.) and then adjusted to pH 12.3 with 25% NaOH. The solution is then transferred to a 1.5 L stainless steel jacketed pressure vessel. 1,2-Epoxyhexane (50 mL) is then added to the pressure vessel and the solution is heated at 110° C. for four hours at 30 psi. After cooling to room temperature, the solid that is precipitated is collected by suction filtration, washed with 1 L of distilled water and then dried in a vacuum oven at 50° C. This solid product is ground into a powder using a Wiley mill fitted with a 20 mesh screen and then washed with 500 mL of ethyl acetate and dried in a vacuum oven. The resulting product (72.2 g) is a light brown solid hydroxyhexyl hemicellulose. A film pressed from this product according to the Film-Forming Method described herein exhibits a contact angle of 62° according to the Contact Angle Test Method and a water solubility of 90% according to the Water Solubility Test Method described herein.

Example 4

Comparative Example

Hemicellulose powder (60.0 g) obtained from Grain Processing Corporation is added in portions to 500 mL of water in a 1 L beaker on a hot plate/stirrer. The mixture is stirred with heating (60-70° C.) until all of the hemicellulose is dissolved. Sodium sulfate (5.0 g) is added and the solution is cooled to room temperature (23.3° C.±4° C.) and then adjusted to pH 12.3 with 25% NaOH. The solution is then transferred to a 1 L Ace Glass 6423 pressure reactor fitted with a flexible shaft mechanical stirrer, temperature probe, a pressure equalizing addition funnel, a Teflon® tube connected to a manifold fitted with a pressure gauge, 65 psi rupture disc and an adjustable pressure relief valve set to 30 psi. n-Butylglycidyl ether (90 mL) is added dropwise to the solution and the mixture is heated at 85° C. for four hours at 15 psi. After cooling to room temperature, the solid that is precipitated is collected by suction filtration, washed with 1 L of distilled water and then dried in a vacuum oven at 50° C. to yield 90.6 g of solid product. This solid product is ground into a powder using a Wiley mill fitted with a 20 mesh screen and then washed with 500 mL of acetone and dried in a vacuum oven. The resulting product (72.2 g) is a light brown solid. A film pressed from this product according to the Film-Forming Method described herein exhibits a contact angle of 63° according to the Contact Angle Test Method and a water solubility of 38% according to the Water Solubility Test Method described herein.

Test Methods

Unless otherwise indicated, all tests described herein including those described under the Definitions section and the following test methods are conducted on samples, test equipment and test surfaces that have been conditioned in a conditioned room at a temperature of 73° F.±4° F. (about 23° C.±2.2° C.) and a relative humidity of 50%±10% for 12 hours prior to the test. Further, all tests are conducted in such conditioned room.

Heteropolysaccharide Determination Test Method

To determine if a polysaccharide comprises different types of monosaccharide components (sugar units), the polysaccharide is analyzed by hydrolyzing the polysaccharide with acid at elevated temperature, derivatizing the released monosaccharide components, and determining monosaccharide components by gas chromatography:

i. Prepare reference (standard) solutions of known sugars by weighing 0.0140-0.0170 g of the appropriate (i.e., expected) sugars into separate vials. (Typical sugars might include arabinose, xylose, glucose, mannose, and galactose.) Dissolve each sugar in 15 mL of 1M sodium chloride solution.

ii. Prepare a digested reference (standard) solution by weighing 0.0140-0.0170 g of the appropriate (i.e., expected) sugars into a vial. (Typical sugars include arabinose, xylose, glucose, mannose, and galactose.) Add 10 mL of 1M HCl. Heat in a heating block for 2 hours at 100° C. Remove the vial from heat and allow it to cool for 10 minutes. Adjust the pH to neutral (pH 7) using 2M sodium hydroxide. Verify with pH paper.

iii. Hydrolyze a sample of the polysaccharide to be tested by weighing about 0.1 g into a vial, adding 10 ml of 1M HCl and heating for 2 hours at 100° C. Remove the vial from heat and allow to cool for 10 minutes. Adjust the pH to neutral (pH 7) using 2M sodium hydroxide. Verify with pH paper.

iv. To derivatize the standards and the polysaccharide sample, filter a portion of each, using a syringe filter (GHP Acrodisc, 13 mm, 0.45 μm, Pall Life Sciences, Ann Arbor, Mich. 48103), into its own vial. Transfer 200 μL of the filtered standard or polysaccharide solution into another vial containing 1 mL of a 2% sodium borohydride ($NaBH_4$) in dimethyl sulfoxide solution. Heat the vials in a 40° C. water bath for 90 minutes. Remove the vials from the water bath and immediately add 100 μL of glacial acetic acid followed by 200 μL of 1-methylimidazole and 2 mL acetic anhydride to each vial. Swirl and let reaction proceed 10 minutes. Add 10 mL deionized water (18 MΩ as described in the contact angle test) using a graduated cylinder to each vial and let stand for 30 minutes. Add 3 mL dichloromethane (DCM) to each vial and vortex each for 30 seconds. Allow the DCM and water layers to separate. Transfer the DCM layer from each vial into a corresponding GC vial containing approximately 0.2 g of sodium sulfate. Place the vial in the freezer for 30 minutes.

v. Chromatographic Analysis of Standards and Polysaccharide Samples—The solutions prepared by the procedures described above are analyzed by gas chromatography with a mass spectrometric detector, GC-MS, Model G1800B GCD Plus, Hewlett-Packard, now Agilent Technologies, or Model 5975B, Agilent Technologies, Inc., Santa Clara, Calif. 95051). Analysis conditions:

GC Inlet Temperature: 250° C.
Detector Temperature: 300° C.
Injection Volume: 1 µL (Splitless Injection)
Column Temperature Profile: 125° C. for 1 minute, then increase at 10° C. per minute to 400° C., and hold for 10 minutes)
Column: DB-5HT, 30 meter by 0.32 mm ID (J&W Agilent Technologies, Inc., Santa Clara, Calif. 95051)
Flow Rate: 1.5 ml/min
Carrier Gas: Helium
Solvent Delay: 4 min Remove the vial from the freezer and inject 1 µL of the DCM layer into the GC-MS.

The retention times of components eluting from the capillary column and their mass spectra are used to identify the monosaccharide components. (The retention times and spectra of the hydrolyzed polysaccharide sample are compared to those of the individual sugars in the reference and digested reference standard solutions.) The identification of two or more different types of monosaccharide components within a polysaccharide means that the polysaccharide is a heteropolysaccharide.

Thermoplastic Heteropolysaccharide Derivative Determination Test Method

To determine if a heteropolysaccharide derivative is thermoplastic, a film of the heteropolysaccharide derivative is attempted to be made by the Film-Forming Method described herein. If a film can be made by the Film-Forming Method, then the heteropolysaccharide derivative is thermoplastic for purposes of the present invention.

Film-Forming Method

A film of a heteropolysaccharide derivative is made, if possible, by using a Carver press equipped with heated platens. The Carver press is commercially available from Carver, Inc., of Wabash, Ind. The platens are preheated in a closed position with no pressure on them to a temperature of anywhere between 50° F. to 450° F. depending upon the material. Some materials burn and/or foam at higher temperatures. If that is the case, then initially preheat the platens to a lower temperature within the range and increase until a film is formed or the material burns and/or foams. Stainless steel shims are combined to form a circular volume into which the film is to be made. The stainless steel shims are cleaned with soap and water, rinsed with acetone and then rinsed with deionized water before use every time. Care is taken not to contaminate the shims. A 10.16 cm×10.16 cm (4"×4") 0.02032 cm (0.008") thick stainless steel shim with a 5.08 cm (2") diameter round cutout in the center of the shim is placed on top of, in a face-to-face manner, a solid 10.16 cm×10.16 cm (4"×4") 0.0508 cm (0.020") thick clean stainless steel shim such that the solid shim covers one side of the round cutout. This shim combination is then placed on a balance and the balance is tared. Next, 0.55 g of the heteropolysaccharide derivative, without any added plasticizer and hydrophilizing agents (wetting agents), is deposited within the round cutout via the open side of the round cutout. The heteropolysaccharide derivative must be contained within the round cutout area of the shims combination. The shim combination containing the heteropolysaccharide derivative is removed from the balance. A solid 10.16 cm×10.16 cm (4"×4") 0.0508 cm (0.020") thick clean stainless steel shim is placed on the shim combination such that the solid shim covers the open side of the round cutout such that the heteropolysaccharide derivative is sandwiched between the two solid shims in the volume formed by the round cutout in the center shim. The preheated platens on the Carver press are opened to permit the sandwich of shims containing the heteropolysaccharide derivative to be placed in between the preheated platens on the Carver press. The preheated platens are then closed to contact the sandwich of shims containing the heteropolysaccharide derivative with no pressure for 30 seconds to permit the shims' temperature to equilibrate between the platens and the shims. The pressure applied to the platens is then increased to 10,000 psi and maintained for 90 seconds. The pressure is then released and the platens are then opened to permit removal of the sandwich of shims containing the heteropolysaccharide from the Carver press. One of the solid shims is removed to gain access to the heteropolysaccharide derivative. If the heteropolysaccharide derivative is powdery and/or chaffed, then the heteropolysaccharide derivative is not thermoplastic. Further, if this method produces a film of the heteropolysaccharide derivative, but the film contains bubbles, then the Film-Forming Method should be repeated again and again as necessary with the heteropolysaccharide derivative, but at a temperature that does not create bubbles in the film if one exists. If this method produces a film of the heteropolysaccharide derivative, then the heteropolysaccharide derivative is thermoplastic. Between different material samples, the platens are washed with soap and water, acetone, and de-ionized water respectively. Following cleaning, the platens are dried with an air gun and lens paper.

Contact Angle Test Method

The contact angle of a thermoplastic heteropolysaccharide derivative is determined by measuring the contact angle of a thermoplastic heteropolysaccharide derivative film made by the Film-Forming Method described herein using a DAT 1100 FIBRO system commercially available from Thwing-Albert Instrument Company of West Berlin, N.J.

The syringe and tubing of the DAT 1100 FIBRO system are rinsed with Millipore 18 MΩ Water 3 times. The syringe is then loaded with Millipore 18 MΩ Water and any air bubbles are eliminated from the syringe before inserting into the DAT 1100 FIBRO system. The DAT 1100 FIBRO system is calibrated with the calibration standard provided by the manufacturer. Two 5.08 cm (2") diameter films of a thermoplastic heteropolysaccharide derivative are prepared according to the Film-Forming Method described above. From each film, two strips are cut wide enough and long enough for positioning on the DAT 1100 FIBRO system sample holder and for conducting three contact angle measurements on each strip. One strip is positioned on the sample holder and inserted into the DAT 1100 FIBRO system. Three measurements are taken on each strip The measurements are repeated for the second film using the same procedure. The films are handled with clean tweezers and cotton gloved hands to ensure minimum contact with the measured surface of the film. For each sample, a total of at least 10 contact angle measurements are taken. Additional contact angle measurements according to this method are made of the thermoplastic polysaccharide derivative until the standard deviation of the contact angle is less than 5%. The contact angle is reported as the average contact angle measured at 5 s for a thermoplastic heteropolysaccharide derivative.

The following conditions are used for the DAT 1100 Fibro system: 1) Liquid is Millipore 18 MΩ Water; 2) Timeout is 0.2 minutes; 3) Number of Drops is 2-3 (per strip); 4) Drop size is 4 microliter; 5) Stroke pulse is 11; 6) Time collected is 0.10 s, 5 s and 10 s; 7) Steps is 1; 8) Minimum height is 8; 9) Minimum width is 10; 10) Capture Offset is 0; 11) Travel time is 2; 12) Pump delay is 5; 13) References Lines; 14) Mod threshold is 0; 15) Cannula Tip is 245; 16) Drop bottom is 97; and 17) Paper Position is 8, 18) Application Mode 1.

Water Solubility Test Method

The water solubility of a thermoplastic heteropolysaccharide derivative is determined by measuring the water solubility of a thermoplastic heteropolysaccharide derivative film made by the Film-Forming Method described herein.

Four 5.08 cm (2") diameter films of a thermoplastic heteropolysaccharide derivative are prepared according to the Film-Forming Method described above. Each film is centered on a die having 25 rows and 2 columns of 2 mm×25.4 mm rectangles (Die #2230 commercially available from WDS Inc., Harrison, Ohio). The film is cut into rectangle pieces using the die and a plastic layer. 0.5 g of the rectangle pieces of film are added to a 50-70 mL Wheaton jar and the weight (to 4 decimal places) is recorded as $W_f$. 40 mL of Millipore 18 MΩ Water is added to form a mixture and the exact weight (to 4 decimal places) of added water is recorded $W_w$. The jar is placed on a IKA Shaker for 30 minutes at level 200. 30 g of the mixture in the jar is filtered onto an evaporating dish using a 50 ml syringe and a 0.45 μm filter. The exact weight of the mixture placed in the evaporating dish is recorded as $W_m$. The evaporating dish is heated at 80° C. for at least 5 hours (or longer until dry). The mixture in the evaporating dish is conditioned according to the above temperature and humidity conditions for at least 12 hours. The weight of the residue is recorded as $W_r$. The % water solubility is calculated from the following equation:

$$\% \text{ Water Solubility} = \left(\frac{Wr}{Wf}\right)\left(\frac{Wf + Ww}{Wm}\right) \times 100$$

The average of four replicates is reported as the % water solubility of a thermoplastic heteropolysaccharide derivative.

DSC Test Method

The Tg of a thermoplastic heteropolysaccharide derivative is determined by Differential Scanning Calorimetry. Differential Scanning Calorimetry is carried out using a TA Instruments Q100 DSC equipped with a refrigerated cooling system. Samples (5-15 mg) are placed in standard aluminum pans with a small hole pierced in the lid. A heat/cool/heat cycle is used where the sample is equilibrated at 40° C., heated to 120° C. at 20° C./min, and then held isothermally for 5 minutes in the first cycle to remove all moisture. The sample is then cooled to 40° C. at 10° C./min, equilibrated for 2 min, and then heated to 230° C. at 20° C./min. The inflection point method is used to determine the glass to rubber transition (Tg).

Elemental Analysis Test Method

The Elemental Analysis Test Method for determining the carbon atom to oxygen atom ratio of a material, such as a heteropolysaccharide derivative and/or a thermoplastic heteropolysaccharide derivative may be any suitable elemental analysis test method performed by a commercial testing laboratory such as Galbraith Laboratories, Inc. of Knoxville, Tenn.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A thermoplastic heteropolysaccharide derivative comprising a thermoplastic hemicellulose derivative made from reacting a hemicellulose with a 1,2-epoxy compound having the formula:

wherein $R^1$ is independently selected from the group consisting of: $C_6$ or greater linear or branched aliphatic groups, $-CH_2OR^2$ wherein $R^2$ is independently selected from the group consisting of: $C_6$ or greater linear or branched aliphatic groups and mixtures thereof, and wherein the thermoplastic heteropolysaccharide derivative exhibits a contact angle of less than about 80° as determined by the Contact Angle Test Method and a water solubility of less than about 10% as determined by the Water Solubility Test Method.

2. The thermoplastic heteropolysaccharide derivative according to claim 1 wherein the thermoplastic heteropolysaccharide derivative further comprises an anhydroxylose unit.

3. The thermoplastic heteropolysaccharide derivative according to claim 1 wherein the thermoplastic heteropolysaccharide derivative is derived from a non-wood source.

4. The thermoplastic heteropolysaccharide derivative according to claim 3 wherein the non-wood source comprises an agricultural byproduct.

5. The thermoplastic heteropolysaccharide derivative according to claim 4 wherein the agricultural byproduct is selected from the group consisting of: corn hulls, corn bran, corn fiber, corn stalks, corn cobs, sugar beet pulp, soybean hulls, wheat bran, wheat straw, distiller's grain, oat spelts and mixtures thereof.

6. The thermoplastic heteropolysaccharide derivative according to claim 1 wherein the thermoplastic heteropolysaccharide derivative is derived from a wood source.

7. The thermoplastic heteropolysaccharide derivative according to claim 1 wherein the thermoplastic heteropolysaccharide derivative exhibits a weight average molecular weight of from about 10,000 to about 500,000 g/mol.

8. The thermoplastic heteropolysaccharide derivative according to claim 1 wherein the thermoplastic heteropolysaccharide derivative exhibits a Tg of less than about 200° C.

9. The thermoplastic heteropolysaccharide derivative according to claim 1 wherein the thermoplastic heteropolysaccharide derivative exhibits a Tg that varies with moisture level.

10. The thermoplastic heteropolysaccharide derivative according to claim 1 wherein the thermoplastic heteropolysaccharide derivative comprises one or more ether moieties.

11. The thermoplastic heteropolysaccharide derivative according to claim 1 wherein the thermoplastic heteropolysaccharide derivative comprises one or more monosaccharide units having the formula:

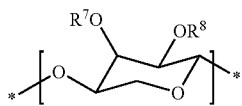

wherein $R^7$ is independently selected from —H, —[CH$_2$CH(R$^9$)O]$_m$H, —[CH$_2$CH(CH$_2$OR$^{10}$)O]$_n$H and mixtures thereof, wherein $R^9$ is independently selected from the group consisting of: linear or branched aliphatic group and mixtures thereof, wherein $R^{10}$ is independently selected from the group consisting of: linear or branched aliphatic group and mixtures thereof, wherein each of m and n are at least 1; wherein $R^8$ is independently selected from —H, —[CH$_2$CH(R$^{11}$)O]$_p$H, —[CH$_2$CH(CH$_2$OR$^{12}$)O]$_q$H and mixtures thereof, wherein $R^{11}$ is independently selected from the group consisting of: linear or branched aliphatic group and mixtures thereof, wherein $R^{12}$ is independently selected from the group consisting of: linear or branched aliphatic group and mixtures thereof, wherein each of p and q are at least 1; wherein the monosaccharide unit comprises at least one $R^7$ and/or $R^8$ that is not —H.

12. The thermoplastic heteropolysaccharide derivative according to claim 11 wherein $R^9$ is independently selected from the group consisting of: $C_1$-$C_{10}$ linear or branched aliphatic groups.

13. The thermoplastic heteropolysaccharide derivative according to claim 12 wherein $R^9$ is independently selected from the group consisting of: $C_2$-$C_4$ linear or branched aliphatic groups.

14. The thermoplastic heteropolysaccharide derivative according to claim 11 wherein $R^{10}$ is independently selected from the group consisting of: $C_1$-$C_{14}$ linear or branched aliphatic groups and mixtures thereof.

15. The thermoplastic heteropolysaccharide derivative according to claim 14 wherein $R^{10}$ is independently selected from the group consisting of: $C_3$-$C_{12}$ linear or branched aliphatic groups.

16. The thermoplastic heteropolysaccharide derivative according to claim 15 wherein $R^{10}$ is independently selected from the group consisting of: $C_6$-$C_{10}$ linear or branched aliphatic groups.

17. An article comprising a thermoplastic heteropolysaccharide derivative according to claim 1.

18. The article according to claim 17 wherein the article comprises at least about 10% by weight of the thermoplastic heteropolysaccharide derivative.

19. The article according to claim 17 wherein the article further comprises a non-heteropolysaccharide selected from the group consisting of: cellulose, starch and mixtures thereof.

20. The article according to claim 17 wherein the article further comprises a thermoplastic polysaccharide selected from the group consisting of:
thermoplastic starch, thermoplastic starch derivative, thermoplastic cellulose, thermoplastic cellulose derivative and mixtures thereof.

21. The article according to claim 17 wherein the article is selected from the group consisting of: films, foams, fibers, filaments, particles, molded objects and mixtures thereof.

22. The article according to claim 17 wherein the article further comprises a hydrophilizing agent.

23. A heteropolysaccharide derivative exhibiting a carbon atom to oxygen atom ratio of greater than about 1.85 as determined by the Elemental Analysis Test Method.

24. The thermoplastic heteropolysaccharide derivative of claim 1 wherein the hemicellulose is further reacted with a second 1,2-epoxy compound having the formula:

wherein $R^3$ is independently selected from the group consisting of: H, $C_1$ to $C_4$ aliphatic groups, —CH$_2$OR$^4$ wherein $R^4$ is independently selected from the group consisting of: $C_1$ to $C_4$ aliphatic groups and mixtures thereof.

* * * * *